United States Patent

Sanders

Patent Number: 5,373,904
Date of Patent: Dec. 20, 1994

[54] CULTIVATOR BLADE

[76] Inventor: Julius R. Sanders, Rte. 1, Box 256, Goshen, Ala. 36035

[21] Appl. No.: 9,961

[22] Filed: Jan. 27, 1993

[51] Int. Cl.⁵ .............................................. A01B 39/12
[52] U.S. Cl. ...................................... 172/730; 172/770; 172/721; 172/726
[58] Field of Search ........ 172/721, 722, 726, 730-732, 172/765, 770; 111/124, 152

[56] References Cited

U.S. PATENT DOCUMENTS

| | | |
|---|---|---|
| 1,193,112 | 8/1916 | Brodie . |
| 1,622,343 | 3/1927 | Reimers et al. . |
| 1,722,293 | 7/1929 | Hoffman . |
| 2,167,044 | 7/1939 | Henderson . |
| 2,191,741 | 2/1940 | Hoffman . |
| 2,323,412 | 7/1943 | Noble . |
| 2,337,777 | 12/1943 | Seaholm ............................. 172/722 |
| 2,345,702 | 4/1944 | Noble . |
| 2,351,388 | 6/1944 | Baxter . |
| 2,432,035 | 12/1947 | Noble . |
| 2,503,884 | 4/1950 | Noble et al. . |
| 2,595,353 | 5/1952 | Graham ............................... 172/730 |
| 2,674,173 | 4/1954 | Wheeler . |
| 2,704,499 | 3/1955 | Radway ............................... 172/733 |
| 2,737,003 | 3/1956 | Beers . |
| 2,932,147 | 4/1960 | Beeston, Jr. . |
| 3,007,533 | 11/1961 | Hill ..................................... 172/770 |
| 3,035,359 | 5/1962 | Ewert . |
| 3,276,208 | 10/1966 | Bolt ..................................... 111/52 |
| 3,581,685 | 6/1971 | Taylor ................................. 111/124 |
| 3,684,032 | 8/1972 | Hawkins .............................. 172/733 |
| 3,880,242 | 4/1975 | Rogers ................................. 172/722 |
| 3,903,817 | 9/1975 | Lewis .................................. 111/152 |
| 4,195,697 | 4/1980 | Griffin ................................. 172/730 |
| 4,408,667 | 10/1983 | Jarris ................................... 172/732 |
| 4,409,912 | 10/1983 | Koronka et al. . |
| 4,580,639 | 4/1986 | Johnson .............................. 172/730 |
| 4,765,127 | 8/1988 | Hamblen . |
| 4,779,686 | 10/1988 | Ryan ................................... 172/730 |
| 4,787,462 | 11/1988 | Nichols ............................... 172/730 |
| 4,850,435 | 7/1989 | Morris et al. ....................... 172/770 |
| 5,036,654 | 8/1991 | Nalutich . |
| 5,050,685 | 9/1991 | Harrison ............................. 172/770 |

FOREIGN PATENT DOCUMENTS 923390  4/1982  U.S.S.R. ............................. 111/724

*Primary Examiner*—Randolph A. Reese
*Assistant Examiner*—Spencer Warnick
*Attorney, Agent, or Firm*—Nies, Kurz, Bergert & Tanburro

[57] ABSTRACT

A blade construction for a cultivator blade or a cultivator sweep, wherein the blade is adapted to sever plants from the ground by digging up the roots, to permit collection of the plants and subsequent separation of the fruit contained thereon. The blade includes first and second elongated body portions that have respective upper surfaces that are disposed relative to each other to define an obtuse included angle. The forward body portion includes a cutting edge that extends longitudinally of the blade, the cutting edge defined by the intersection of the upper planar surface of the first body portion with a longitudinally-extending grinding surface that is oriented at an acute angle relative to the forward upper planar surface. The obtuse included angle between the first and second body portions can range from about 150° to about 170°, and the acute angle at the grinding surface can range from about 25° to about 35°.

2 Claims, 5 Drawing Sheets

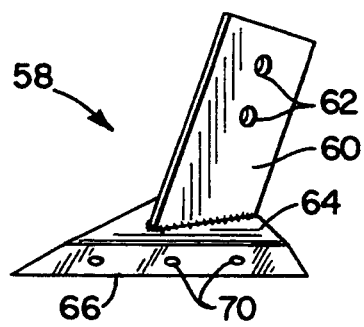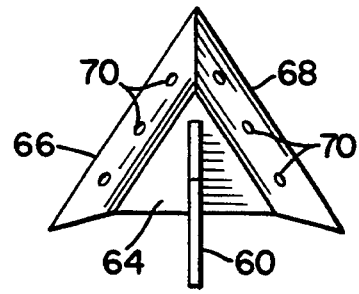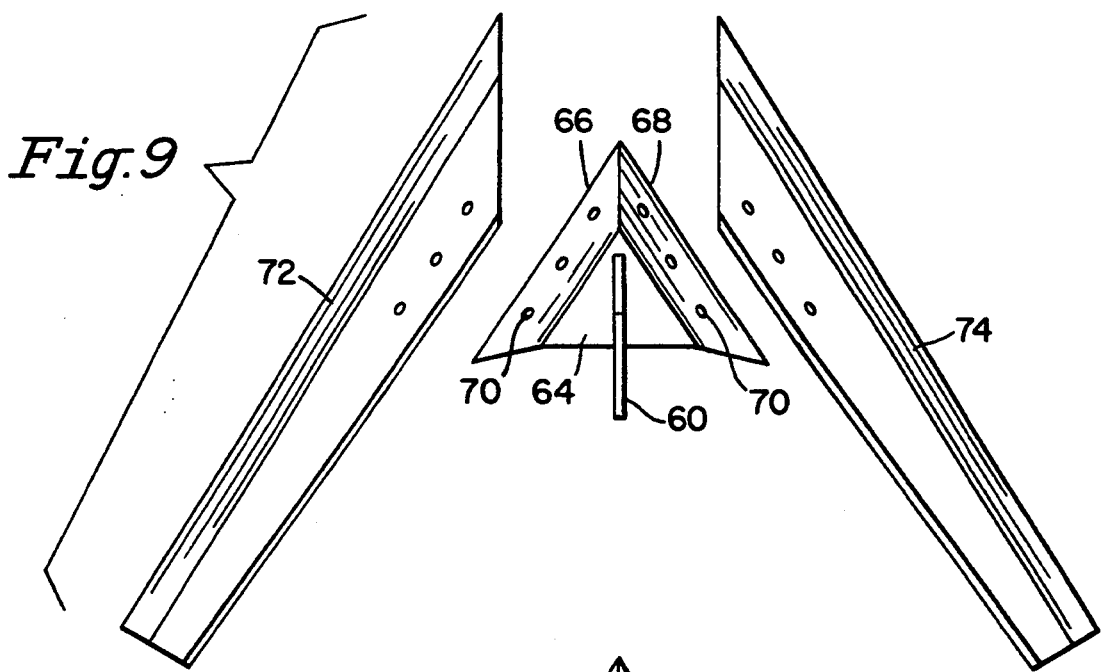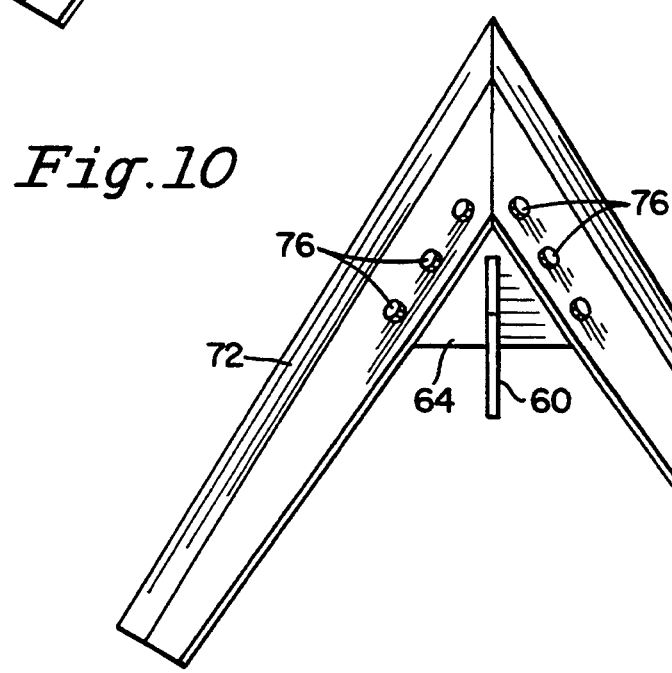

CULTIVATOR BLADE

BACKGROUND OF THE INVENTION

1. Field of the Invention

The present invention relates to cultivating apparatus for movement below the surface of the ground for lifting plants for harvesting and for separating undesired grasses and weeds from the earth adjacent desirable crop materials. More particularly, the present invention relates to cultivator apparatus for digging peanut plants from the ground for harvesting, the apparatus including an improved cultivator blade for passage through the ground and for lifting the plants and plant roots for removal from the ground, in which the blade is self-sharpening for improved efficiency and has a ].lower drag to permit the cultivator blade to be more easily passed through the ground at a lower power input.

2. Description of the Related Art

Peanuts are harvested by digging the peanut plants from the ground and then separating the peanuts from the vines. Examples of cultivators for harvesting peanuts, and in which cultivator blades are provided in the form of a swept-back, generally triangular, sharp-edged plate are disclosed in U.S. Pat. No. 1,193,112, which issued Aug. 1, 1916, to J. H. Brodie, and in U.S. Pat. No. 2,167,044, which issued Jul. 25, 1939, to A. E. Henderson. Each of those patents discloses a unitary blade structure having two angularly arranged cutting edge surfaces for passage through the ground, for elevating the peanut plants, and for severing the roots of the plants from the ground. However, each of the disclosed blade structures has long body portions that extend in the direction of movement of the blade, and that are inclined relative to the direction of movement of the blade, which thereby increase the drag forces acting on the blade. Additionally, blades having leading edges that are so configured quickly become dull and must be removed for sharpening.

Another form of cultivator blade is shown in U.S. Pat. No. 2,345,702, which issued Apr. 4, 1944, to C. S. Noble. That patent discloses an elongated blade that extends across the path of travel of the cultivating apparatus, the blade being arc-shaped in cross section and having sharpened leading and trailing edges to permit the blade to be reversed when one of the edges has become dull. However, that cultivator blade structure also results in high frictional drag, thereby requiring more power for its operation. Additionally, the configuration and orientation of the blade edge relative to the direction of movement of the blade causes the blade edge to quickly become dull, thereby requiring early reversal of the blade, or sharpening of the blade if it had previously been reversed.

It is an object of the present invention to provide an improved cultivator blade structure that results in reduced drag forces acting on the blade and that thereby permits operation of the blade at a lower power input.

It is another object of the present invention to provide a cultivator blade that is capable of self sharpening when in use, to minimize the frequency of blade removal for sharpening.

SUMMARY OF THE INVENTION

Briefly stated, in accordance with one aspect of the present invention, a cultivator blade is provided for digging plants, such as peanut plants, from the ground by passing the blade through the ground at a level below and substantially parallel with the surface of the ground. The cultivator blade is in the form of an elongated structure having a longitudinal major axis adapted to be oriented transversely relative to the direction of movement of the blade for digging plants from the ground.

The blade includes a first elongated body portion having a forward planar upper surface and including a cutting edge extending longitudinally relative to the blade at a forward edge of the first body portion. A second elongated body portion is connected with and extends from the first body portion, the second body portion having a rear planar upper surface oriented relative to the forward planar upper surface to define an obtuse included angle therebetween. The cutting edge is defined by the intersection of the forward upper planar surface with a longitudinally-extending grinding surface oriented at an acute angle relative to the forward upper planar surface.

The forward upper planar surface slopes rearwardly from the cutting edge of the first angle relative to the surface of the ground when the blade is in use, and the rear planar upper surface slopes rearwardly from the forward planar upper surface of a second angle relative to the surface of the ground when the blade is in use. The second angle is smaller than the first angle in order to reduce the frontal area of the blade when it is in use, and thereby reduce drag force acting on the blade as the blade is moved through the ground.

BRIEF DESCRIPTION OF THE DRAWINGS

FIG. 7 is a perspective view of one form of blade holder for holding a pair of cultivator blades that are disposed to define a V-shaped configuration.

FIG. 8 is a top view of the holder shown in FIG. 7.

FIG. 9 is an exploded top view of the holder shown in FIG. 7, along with a pair of cultivator blades in accordance with the present invention.

FIG. 10 is a top view similar to FIG. 9, showing the cultivator blades secured to the holder.

DESCRIPTION OF THE PREFERRED EMBODIMENTS

Figure 1:
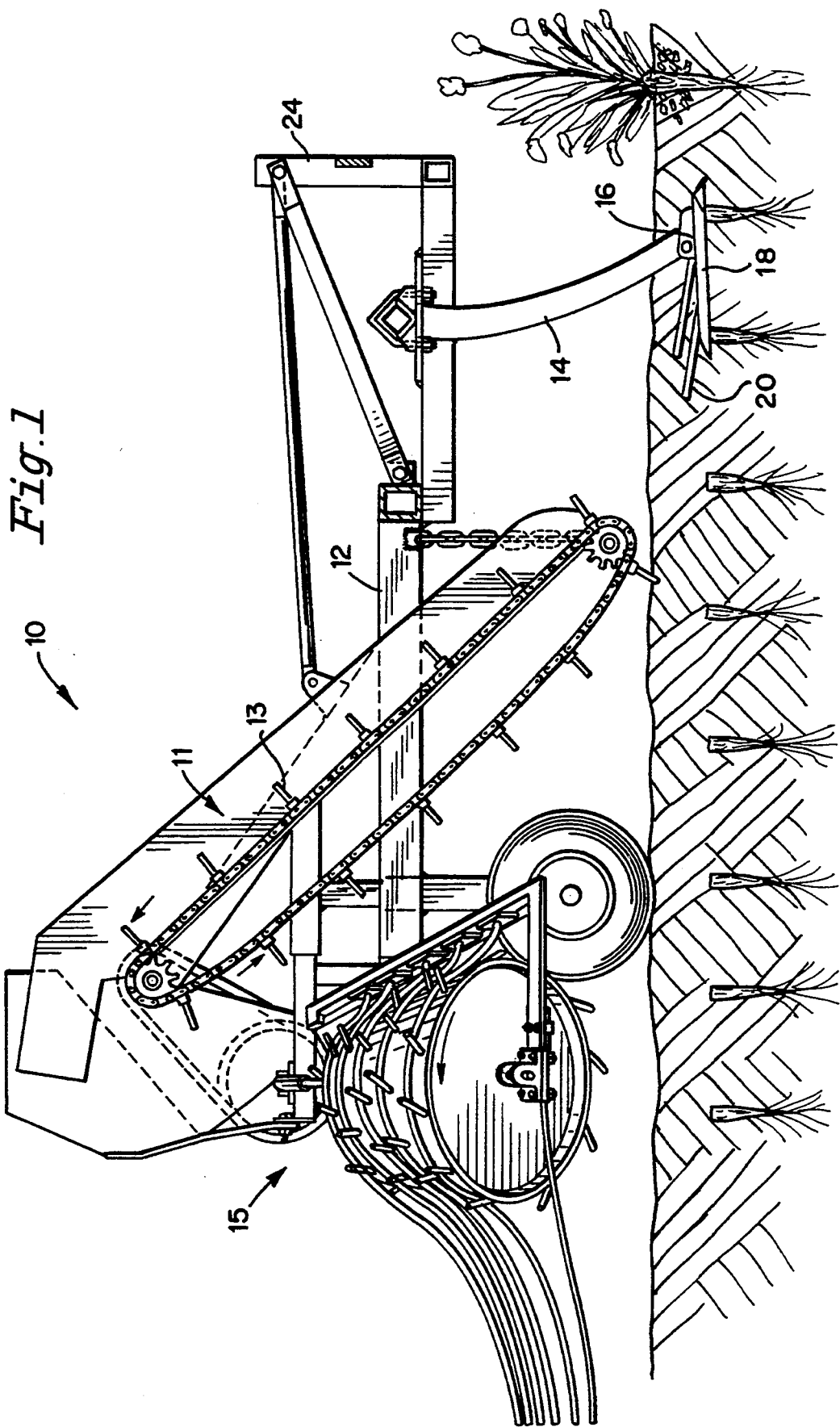
FIG. 1 is a longitudinal, cross-sectional, elevational view of one form of cultivator apparatus, including a cultivator blade in accordance with the present invention for digging peanut and other plants from the ground.

Referring now to the drawings, and particularly to FIG. 1 thereof, there is shown a cultivator apparatus 10 of known overall construction. Apparatus 10 includes a frame 12 that supports a pair of downwardly extending, laterally-spaced, parallel cultivator blade support standards 14, only one of which is visible in FIG. 1. At the lowermost ends of each standard 14 a blade holder 16 is bolted. Holder 16 includes a substantially horizontally-extending plate member 17 (see FIG. 2) that has a number of openings to receive connecting bolts for securely connecting a cultivator blade 18 to the holder. Plate member 17 also includes a plurality of rearwardly-extending parallel rods or fingers 20 that are inclined in an upward and rearward direction from blade 18, relative to the horizontal plane, to gradually elevate the severed plants after the blade has loosened them and the surrounding earth, and to maintain the plants in an elevated condition above the loosened earth.

After the severed plants pass beyond fingers 20, a driven conveyor 11 of conventional construction having picker fingers 13 picks up the severed plants and carries them upwardly and rearwardly, after which they fall onto one of a pair of laterally positioned, rotating inverter drums 15 (only one of which is visible in FIG. 1), which receive the severed plants as they fall from the rearmost portion of the conveyor onto the inverter drum to shake some of the earth from the severed plants, and to turn and invert the severed plants as they fall onto the ground, so that the peanuts or other below-ground crop material faces upwardly for drying and subsequent retrieval by separation from the plant roots. One form of an inverter-shaker apparatus of the type shown in FIG. 1 and briefly described above is disclosed in detail in U.S. Pat. No. 3,625,291, which issued on Dec. 7, 1971, to John R. Paulik, et al., the disclosure of which is hereby incorporated herein by reference to the same extent as if fully rewritten.

Cultivator apparatus 10 is adapted to be connected to a tractor (not shown) by a three point hitch 24, or the like, to enable the apparatus to be pulled through a field behind the tractor for digging and plowing up plants, such as peanut plants, for harvesting. Although described herein in the context of digging and harvesting peanut plants, it will be appreciated by those skilled in the art that the disclosed apparatus can also be employed to harvest other crops, such as potatoes, beets, and the like, and it can also be utilized for the cultural practice of controlling weeds or grasses between row crops, such as peanuts, corn, soybeans, or other cultivated or tilled row crops.

Figure 2:
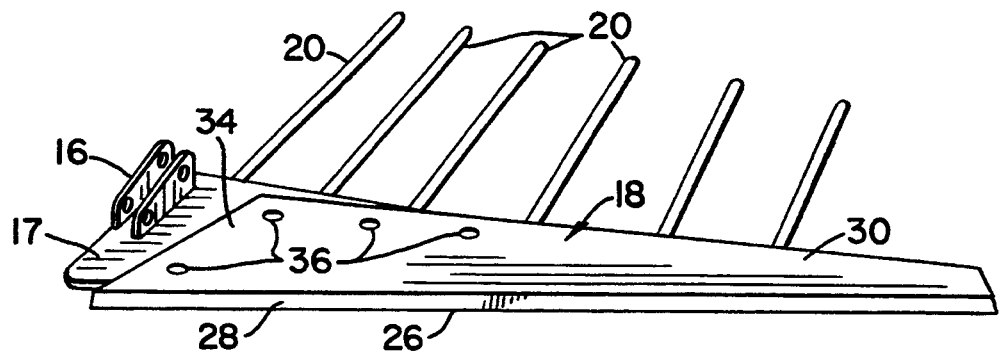
FIG. 2 is a top view of a prior art plow blade that can be employed with the apparatus shown in FIG. 1.
Figure 3:
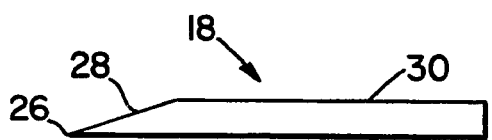
FIG. 3 is an end view of the prior art blade shown in FIG. 2.

The cultivator blades that are used in connection with the device illustrated in FIG. 1 are shown in FIGS. 2 and 3. Each blade 18 is substantially a flat plate of uniform thickness, and that terminates along one longitudinally-extending edge in a sharpened cutting edge 26 that is defined by a ground, inclined surface 28 that extends forwardly from the flat, or planar, top surface 30 of the blade, and that is disposed at an acute angle with the flat, or planar, bottom surface 32 of the blade.

As shown in FIG. 2, the blade has a greater width dimension at one end 34, the left end as viewed in FIG. 2, which is the end by which cultivator blade 18 is secured to horizontally extending plate 17 forming part of holder 16. The additional blade width is provided to enable the placement of positioning holes 36 in the blade body to allow the blade to be securely connected with holder 16 by means of bolts, or the like.

The blade shown in FIGS. 2 and 3 is generally satisfactory for the intended purpose, except that it has a relatively short operating life because the ground through which the blade passes tends to rapidly dull the blade by wearing away cutting edge 26. As a consequence, the blade must frequently be removed and inclined surface 28 must again be ground to restore a sharp cutting edge, or the blade must be replaced with another, sharp blade.

In addition to the need for frequent resharpening of the prior art blade shown in FIGS. 2 and 3, that form of blade and its inclination relative to the direction of movement of the blade through the ground results in the exposure of a substantial blade frontal area that increases the frictional drag forces acting on the blade as it passes through the ground. As a consequence, the power necessary to operate the cultivator device is unnecessarily increased.

Figure 4:
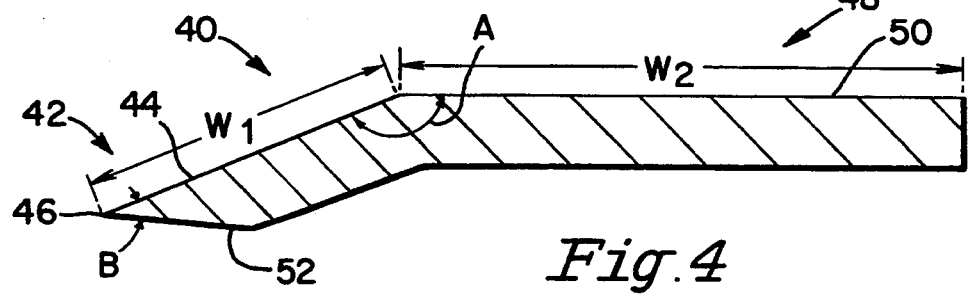
FIG. 4 is a transverse cross-sectional view of one form of cultivator blade in accordance with the present invention.

The above-noted drawbacks of the prior art cultivator blade are overcome in the blade configuration in accordance with the present invention, which is shown in end view in FIG. 4. Blade 40 includes a first, forward elongated body portion 42 that has a forward planar upper surface 44 that terminates at its free end in a cutting edge 46 that extends longitudinally relative to blade 40.

A second, rear elongated body portion 48 is connected with and extends rearwardly from first body portion 42. Second body portion 48 includes a rear planar upper surface 50 that is oriented relative to forward planar upper surface 44 to define an obtuse included angle A therebetween. Preferably, the magnitude of obtuse included angle A ranges from about 150° to about 170°.

The width $W_1$ of forward planar upper surface 44, taken in the direction perpendicular to cutting edge 46, is preferably about 1.75 inches. The corresponding width $W_2$ of rear planar upper surface 50 can range from about 2.6 inches to about 3.25 inches, in order to provide some degree of vertical support to the plants after they have been severed by the action of cutting edge 46, and also to provide sufficient blade material to permit the placement of positioning apertures to enable blade 40 to be securely attached to a blade holder (not shown). Preferably, the ratio of the width $W_1$ of forward planar upper surface 44 relative to width $W_2$ of rear planar upper surface 50 is from about 0.5 to about 0.7, most preferably from about 0.54 to about 0.67.

Blade 40 can have a uniform thickness, as shown, which can be about ⅜ of an inch, although somewhat larger or somewhat smaller blade thicknesses can also be provided. Furthermore, blade 40 can be most easily formed from a flat plate of material, preferably hardened steel, that is readily available and that has parallel front and rear faces. Such a plate can be provided in elongated, rectangular form and can be bent into the shape shown in cross section in FIG. 4.

Cutting edge 46 is defined by the intersection of forward upper planar surface 44 with a longitudinally-extending grinding surface 52 that is oriented at an acute angle B relative to forward upper planar surface 44. Preferably the acute angle is from about 25° to about 35°.

When cultivator blade 40 illustrated in FIG. 4 is in use, it preferably is oriented in such a manner that grinding surface 52 is substantially parallel with the direction of movement of the blade through the ground. Such an orientation permits the cutting edge to readily pass through the ground, whereupon the plants' roots and associated earth are elevated by sliding along front planar upper surface 44, which therefore undergoes some moderate degree of frictional wear as the earth passes over it. Similarly, the earth passing along grinding surface 52 tends to wear that surface away, but in a direction parallel with the original surface. The combined effects of the wear both on front planar upper surface 44 and on grinding surface 52 operate to maintain a substantially sharp cutting edge 46, thereby avoiding the need for frequent blade removal for resharpening of the cutting edge.

Figure 5:
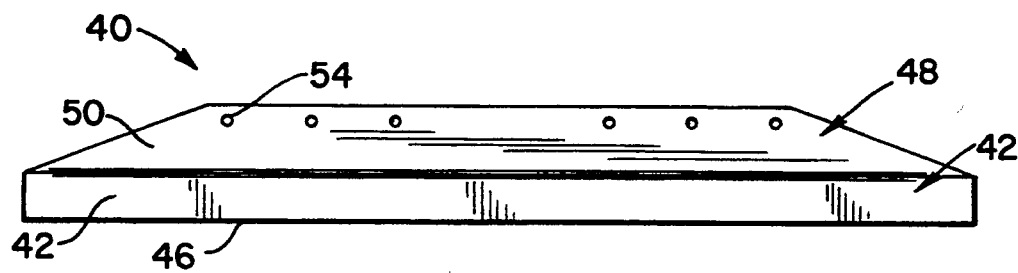
FIG. 5 is a top view of the blade shown in FIG. 4.
Figure 6:
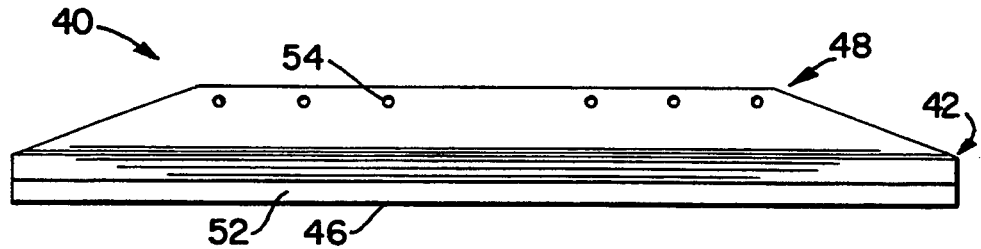
FIG. 6 is a bottom view of the blade shown in FIG. 4.
Figure 4A:
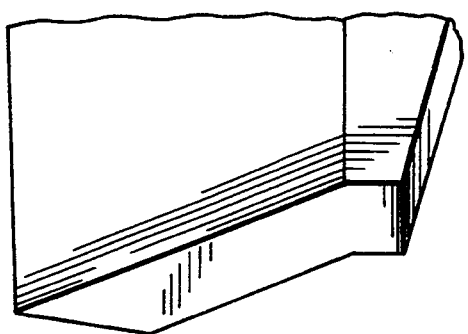
FIGS. 4A and 4B are left and right end views, respectively, of the cultivator blade shown in FIG. 4.
Figure 4B:
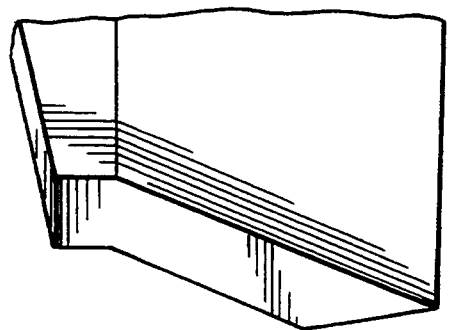

The blade illustrated in cross section in FIG. 4 is shown in end views in FIGS. 4A and 4B, is shown in a top view in FIG. 5, and is shown viewed from the bottom in FIG. 6. Positioning holes 54 are provided in second elongated body portion 48 to permit blade 40 to be securely attached to a suitable blade holder or blade support (not shown), which can, if desired, be the support illustrated in FIG. 1. Additionally, as is also apparent from FIGS. 5 and 6, blade 40 is symmetrical about a transverse central axis, and thus it can be used in either orientation in the apparatus shown in FIG. 1, thereby eliminating the need to maintain a stock of left hand blades and a stock of right-hand blades.

Figure 4C:
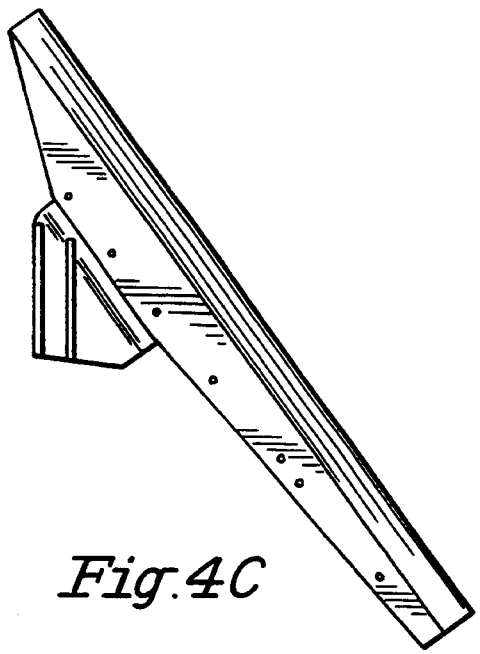
FIGS. 4C and 4D are top views of a left side and a right side, respectively, of a variation of the cultivator blade shown in FIG. 4, together with their associated blade holders.
Figure 4D:
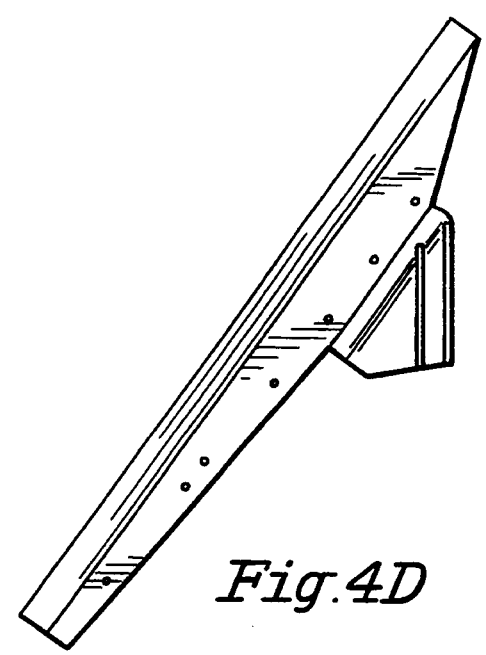
Figure 4E:
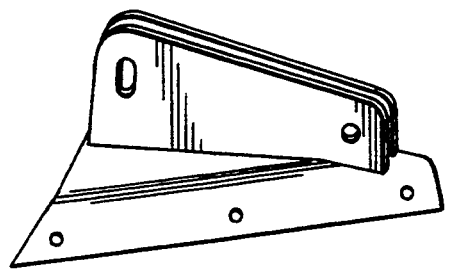
FIGS. 4E and 4F are front perspective views of left and right side cultivator blade holders, respectively, for holding cultivator blades of the types shown in FIGS. 4, 4C, and 4D.
Figure 4F:
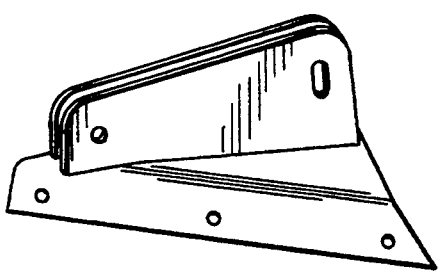

FIGS. 4C and 4D show blades that incorporate the angular relationships in accordance with the present invention and that are also intended to be used in a single orientation during a cultivation operation. FIG. 4C shows a left-side blade and FIG. 4D shows a right-side blade, as viewed forward of and looking toward the front of a cultivator device that includes the blades shown. FIGS. 4E and 4F are enlarged, perspective views of blade holders that are provided to connect the blades to a cultivator device.

Another type of blade holder 58, sometimes referred to as a "sweep," with which the present invention can be employed is shown in FIGS. 7 through 10. As shown in FIGS. 7 and 8, a swept-back standard 60 is provided for connection through bolt holes 62 with a suitable support column (not shown) on a cultivator device, as will be appreciated by those skilled in the art. Standard 60 terminates at its lower edge in a sweep platform 64, which is of generally triangular shape and includes a pair of swept-back edges 66, 68 (see FIG. 8) that preferably define therebetween an included angle of about 65°. Platform 64 includes a plurality of positioning holes 70 positioned inwardly of and preferably parallel with edges 66 and 68 for bolting suitable cultivator blades to the sweep. As best seen in FIG. 8, the forward or leading portions of platform 64 in which positioning holes 70 are provided are turned down at an angle of about 5° to about 8°, relative to the uppermost surface of platform 64.

As shown in FIGS. 9 and 10, a pair of cultivator blades 72, 74 having a shape in accordance with the blade of the present invention, as hereinbefore described, are adapted to be bolted to sweep platform 64 and are initially positioned as shown in FIG. 9, relative to the sweep. Blades 72 and 74 are then securely bolted to sweep platform 64 with connecting bolts 76, or the like, to provide a sweep structure as shown in FIG. 10.

Figure 11A:
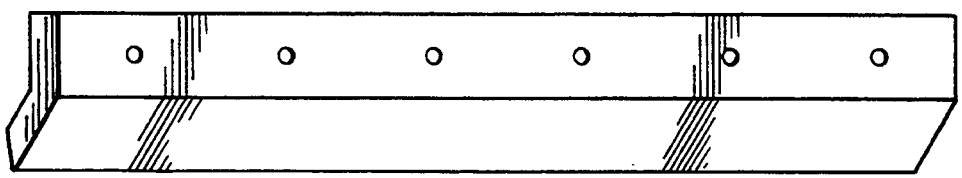
FIGS. 11A, 11B, and 11C are top, bottom, and transverse cross sectional views, respectively, of another form of a blade in accordance with the present invention.
Figure 11B:
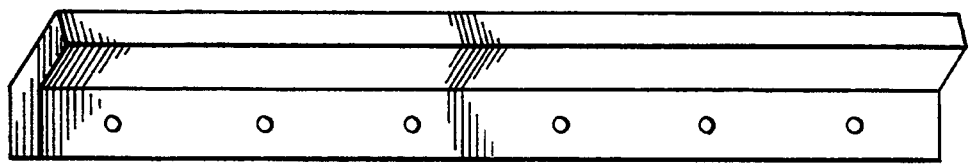
Figure 11C:
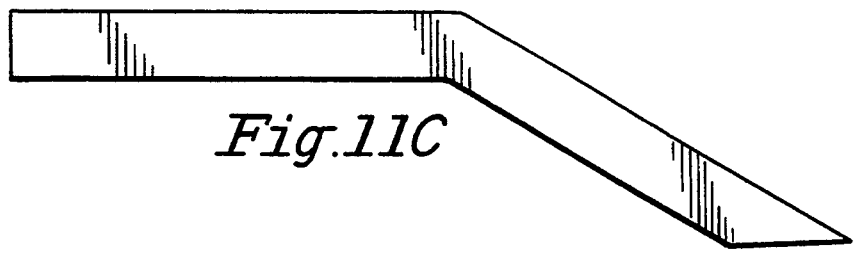

FIGS. 11A, 11B, and 11C show a blade in accordance with the present invention, incorporating the structural features and the angular relationships hereinbefore described, but that has a uniform width and thickness. Such a blade can be used on earth moving equipment, such as front end loaders, earth-loading pans, and other machinery that is designed for the movement of earth.

Figure 12A:
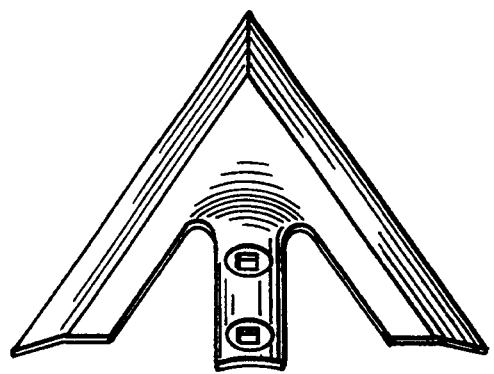
FIGS. 12A, 12B, and 12C are top views of several cultivator sweeps of different lengths, wherein the sweeps each incorporate the structural aspects of the present invention.
Figure 12B:
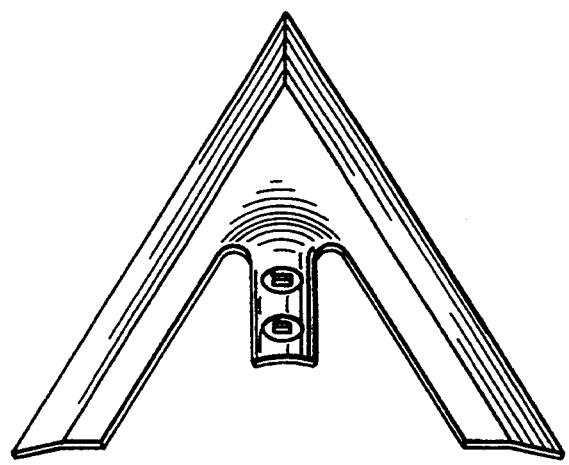
Figure 12C:
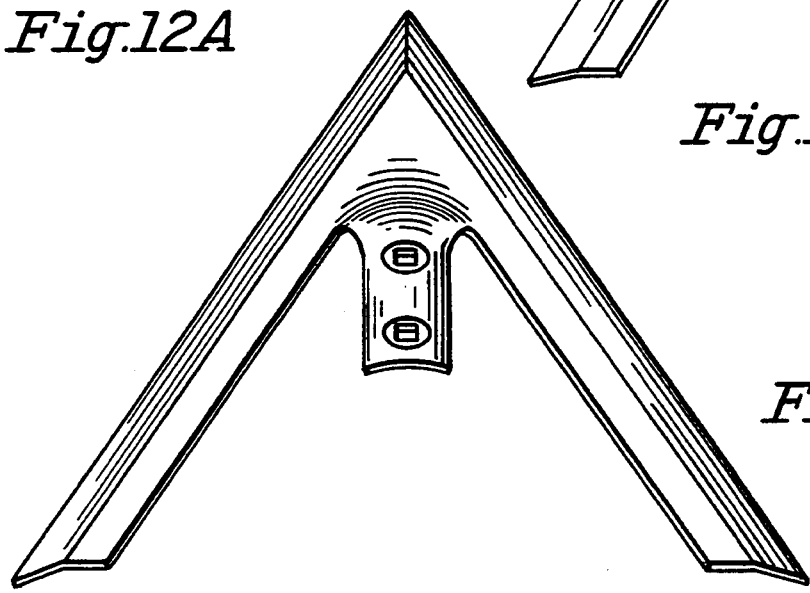

FIGS. 12A, 12B, and 12C show three distinct sweeps each having the same blade angular and width relationships, but having different blade longitudinal lengths. Such sweeps are usable for the cultural practice of grass and weed control in row crops such as peanuts, corn soybeans, or the like. As will be apparent to one having skill in the art, the present invention can also be used in other ground tillage practices.

In operation, the cultivator blades in accordance with the present invention are so oriented in a suitable blade holder to position grinding surface 52 substantially parallel with the direction of movement of the blade through the ground. As the blade as illustrated in FIG. 4 is pushed through the ground, at a depth of several inches or so, cutting edge 46 passes through the ground causing the ground above the plane of grinding surface 52 to pass over first elongated body portion 42 and along the forward planar upper surface 44. As a result, plants to be severed from the ground have their roots and associated earth pushed upwardly, to sever them from the surrounding ground. In the case of peanuts or other edible root-like crops, the roots and the peanuts or other crops dry to permit subsequent separation of the crop from the unwanted plant material. In the case of undesired grasses and weeds, the roots are exposed to the air to dry them, and thereby to kill the undesirable plant growth so it does not draw plant nutrients from the desirable adjacent crop plants.

After passing along forward planar upper surface 44 the plant roots and associated earth pass rearwardly over second body portion 48 and along rear planar upper surface 50, whereupon the plants can be collected for subsequent separation of the fruit from the plants. Because of the smaller angle of rear planar upper surface 50, relative to the direction of movement of the blade through the ground, blade 40 in accordance with the present invention presents a substantially reduced frontal area as compared with the prior art blades, which continued rearwardly by providing a continuous flat inclined upper blade surface. In that regard, the blade frontal area is the projected area of the blade in a plane parallel with the longitudinal axis of the blade and perpendicular to the direction of blade movement. The reduced frontal area provided by a blade made in accordance with the present invention reduces the drag forces acting on the blade, and thereby permits the blade to pass through the ground with a smaller power input requirement than would be the case for the prior art blade structure and orientation.

Additionally, and as earlier noted, because of the positions relative to the direction of blade movement through the ground of forward planar upper surface 44 and of grinding surface 52, which together define the cutting angle formed at cutting edge 46, the erosive effect of the moving earth that otherwise would require frequent resharpening of the blade operates to self-sharpen the blade by wearing away at a gradual rate the forward planar upper surface and also the grinding surface. As a result, the blade in accordance with the present invention results in fewer interruptions in the cultivation operation for purposes of blade resharpening, and thus it provides greater productivity.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A cultivator blade for digging plants, such as peanut plants, from the ground by passing the blade through the ground at a level below and substantially parallel with the surface of the ground, said cultivator blade comprising an elongated blade having a longitudinal major axis adapted to be oriented transversely relative to a direction of movement of the blade for digging peanut plants from the ground, the blade including a first elongated body portion defining a forward planar upper surface and including a cutting edge extending longitudinally relative to the blade at a forward edge of the first body portion, a second elongated body portion connected with and extending rearwardly from the first body portion, the second body portion defining a rear planar upper surface of the cultivator blade, wherein the rear planar upper surface is oriented relative to the forward planar upper surface to define an obtuse included angle therebetween that ranges from about 150° to about 170°, a planar grinding surface extending rearwardly from the cutting edge on an underside of the first elongated body portion, the cutting edge extending along and defined by the junction of the forward edge of the forward planar upper surface and a forward edge of the planar grinding surface, wherein the planar grinding surface is parallel with the surface of the ground when the blade is in use and wears away during use of the blade to maintain a substantially sharp cutting edge to avoid frequent blade removals for resharpening of the cutting edge, wherein the forward upper planar surface slopes rearwardly and upwardly from the cutting edge at a first acute angle relative to the planar grinding surface of from about 25° to about 35°, and where the rear planar upper surface slopes rearwardly from and downwardly relative to the forward planar upper surface and upwardly relative to the planar grinding surface and at a second acute angle relative to the planar grinding surface, wherein the second acute angle is smaller than the first acute angle to reduce the projected frontal area of the blade in a plane perpendicular to the planar grinding surface when the blade is in use and thereby reduce drag forces acting on the blade as the blade is moved through the ground, wherein the ratio of the width of the forward upper planar surface to the width of the rear planar surface, taken in a direction perpendicular to the cutting edge, is from about 0.5 to about 0.7 to minimize projected frontal area of the blade when in use, and wherein the second acute angle is greater than zero to impart additional upward motion to plants that are dug from the ground by the cultivator blade and that are initially partially elevated by the forward planar surface.

2. A cultivator blade in accordance with claim 1 wherein the first and second elongated body portions have a thickness of about three-eighths of an inch.

* * * * *